United States Patent
Thakkar et al.

(10) Patent No.: US 10,713,503 B2
(45) Date of Patent: Jul. 14, 2020

(54) VISUAL OBJECT DETECTION SYSTEM

(71) Applicant: General Electric Company, Schenectady, NY (US)

(72) Inventors: Jaymin Thakkar, Bangalore (IN); Ankit Sharma, Bangalore (IN); Priyanka Joseph, Melbourne, FL (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 211 days.

(21) Appl. No.: 15/862,238

(22) Filed: Jan. 4, 2018

(65) Prior Publication Data

US 2018/0218225 A1 Aug. 2, 2018

Related U.S. Application Data

(60) Provisional application No. 62/452,435, filed on Jan. 31, 2017.

(51) Int. Cl.
*G06K 9/00* (2006.01)
*G06T 7/50* (2017.01)
*H04W 4/02* (2018.01)
*G06F 16/29* (2019.01)

(52) U.S. Cl.
CPC ......... *G06K 9/00791* (2013.01); *G06F 16/29* (2019.01); *G06K 9/00798* (2013.01); *G06T 7/50* (2017.01); *H04W 4/023* (2013.01); *G06T 2207/10028* (2013.01)

(58) Field of Classification Search
CPC . G06T 2207/30252; G06T 2207/30241; G06T 7/73; G06T 7/74

USPC ....... 382/103, 104, 106, 107, 170, 153, 209, 382/224, 278, 286, 291; 340/902, 903, 340/935, 937
See application file for complete search history.

(56) References Cited

U.S. PATENT DOCUMENTS

| | | | | |
|---|---|---|---|---|
| 5,304,980 A | * | 4/1994 | Maekawa | B60R 1/00 340/435 |
| 6,959,235 B1 | | 10/2005 | Abdel-Malek et al. | |
| 7,376,492 B2 | * | 5/2008 | Srack | G01B 5/0025 33/288 |
| 7,463,348 B2 | | 12/2008 | Chung | |
| 7,657,532 B2 | * | 2/2010 | Murakami | G06F 21/35 340/10.1 |
| 7,772,539 B2 | | 8/2010 | Kumar | |

(Continued)

OTHER PUBLICATIONS

General Electric Company, "LocoVISIONTM", RailConnect™ 360; 2014. (1 page).

*Primary Examiner* — Yossef Kassa
(74) *Attorney, Agent, or Firm* — Buckley, Maschoff & Talwalkar LLC

(57) ABSTRACT

A system includes a camera configured to generate two-dimensional (2D) image or video data of an area of a route ahead of a vehicle moving along the route, wherein wayside equipment is disposed alongside the route in the 2D image or video data. The system also includes one or more processors configured to determine a distance between reference markings in the route along a direction that is transverse to a direction of travel of the vehicle along the route. The one or more processors also are configured to determine a separation distance between the camera and the wayside equipment based on the distance between the reference markings in the route.

20 Claims, 5 Drawing Sheets

(56) References Cited

U.S. PATENT DOCUMENTS

| | | | |
|---|---|---|---|
| 7,782,227 B2* | 8/2010 | Boss | G08G 1/162 340/902 |
| 7,805,227 B2 | 9/2010 | Welles et al. | |
| 7,965,312 B2 | 6/2011 | Chung et al. | |
| 7,987,559 B2* | 8/2011 | Chou | E05D 3/10 16/342 |
| 8,229,162 B2* | 7/2012 | Miyamoto | G06K 9/2036 382/103 |
| 8,412,393 B2 | 4/2013 | Anderson et al. | |
| 8,515,577 B2* | 8/2013 | Wang | B25J 9/1689 700/247 |
| 8,594,370 B2* | 11/2013 | Schamp | B60R 21/0134 382/103 |
| 8,630,493 B2* | 1/2014 | Gokturk | G06K 9/621 382/103 |
| 8,712,610 B2 | 4/2014 | Kumar | |
| 8,892,331 B2* | 11/2014 | Kumabe | B60W 40/04 340/995.18 |
| 9,098,752 B2* | 8/2015 | Huntzicker | B60Q 9/008 |
| 9,575,007 B2 | 2/2017 | Rao et al. | |
| 9,682,716 B2 | 6/2017 | Noffsinger et al. | |
| 9,694,835 B2 | 7/2017 | Cooper et al. | |
| 9,710,720 B2 | 7/2017 | Mitti et al. | |
| 9,802,631 B2 | 10/2017 | Matthews et al. | |
| 2009/0037039 A1 | 2/2009 | Yu et al. | |
| 2010/0027009 A1 | 2/2010 | Bhotika et al. | |
| 2010/0027841 A1 | 2/2010 | Sebastian et al. | |
| 2014/0046513 A1 | 2/2014 | Cooper et al. | |
| 2014/0129154 A1 | 5/2014 | Cooper et al. | |
| 2014/0138493 A1 | 5/2014 | Noffsinger et al. | |
| 2014/0151512 A1 | 6/2014 | Cooper et al. | |
| 2014/0156123 A1 | 6/2014 | Cooper et al. | |
| 2014/0164039 A1 | 6/2014 | Mitti et al. | |
| 2014/0207317 A1 | 7/2014 | Noffsinger et al. | |
| 2015/0053827 A1 | 2/2015 | Noffsinger et al. | |
| 2015/0081214 A1 | 3/2015 | Cooper et al. | |
| 2015/0158513 A1 | 6/2015 | Costa et al. | |
| 2015/0179003 A1 | 6/2015 | Cooper et al. | |
| 2015/0183448 A1 | 7/2015 | Cooper et al. | |
| 2015/0235484 A1 | 8/2015 | Kraeling et al. | |
| 2015/0268172 A1 | 9/2015 | Naithani et al. | |
| 2015/0269722 A1 | 9/2015 | Naithani et al. | |
| 2015/0285688 A1 | 10/2015 | Naithani et al. | |
| 2015/0294153 A1 | 10/2015 | Naithani et al. | |
| 2015/0367872 A1 | 12/2015 | Plotnikov et al. | |
| 2016/0039436 A1 | 2/2016 | Bhagwatkar et al. | |
| 2016/0054250 A1 | 2/2016 | Kumar et al. | |
| 2017/0158213 A1 | 6/2017 | Mathews et al. | |
| 2017/0160746 A1 | 6/2017 | Rao et al. | |
| 2017/0255824 A1 | 9/2017 | Miller et al. | |

* cited by examiner

VISUAL OBJECT DETECTION SYSTEM

CROSS-REFERENCE TO RELATED APPLICATIONS

This application claims priority to U.S. Provisional Patent Application No. 62/452,435, which was filed 31 Jan. 2017, and the entire disclosure of which is incorporated herein by reference.

FIELD

Embodiments of the subject matter disclosed herein relate to examining visual data (e.g., images or video) to detect objects represented by the visual data.

BACKGROUND

Images and video can be helpful to automate detection of objects. Some systems use optical recognition of objects shown in images or video to identify the objects appearing in the image data. This can involve differentiating different objects appearing in the images or video from each other based on how the objects appear in the images or video.

One problem with some known techniques for optical object recognition is the inability to accurately determine how far objects are from the camera that provided the images or video. A camera may provide two-dimensional (2D) images or video that can make it difficult for an automated system to accurately determine the size of objects in the images or video due to the lack of knowledge of how far the objects are from the camera. For example, the same object may appear larger when the object is closer to the camera than when the object is farther from the camera. This can interfere with the accurate automated identification and/or automated detection of how far the object is from the camera.

While additional cameras can be used to approximate a depth of field in the images or videos, this increases the cost and/or complexity of the system, and may not be realizable in systems where there is insufficient room or space for multiple cameras to be generally oriented in a common direction.

In some transportation systems, such as rail vehicle transportation systems, wayside equipment disposed alongside the routes traveled by the vehicles perform various functions (e.g., signaling, monitoring operations of the vehicles, etc.). The locations of the wayside equipment may need to be monitored in order to update databases used by the vehicles. The vehicles may rely on these databases accurately reflecting the locations of the wayside equipment to ensure that the vehicles continue to safely travel along the routes. Currently, the locations of the wayside equipment are determined or checked by operators onboard the vehicles manually recording the locations of the equipment as the vehicles move along the routes. This is a time- and cost-intensive way to determine, check, or verify that the locations of the wayside equipment is accurate.

BRIEF DESCRIPTION

In one embodiment, a system includes an optical sensor that is configured to be mounted to a moving vehicle. The optical sensor is configured to generate visual data representative of a field of view of the optical sensor that is outside of the vehicle. One or more processors of the system are configured to receive the visual data representative of the one or more objects located outside of the vehicle. The one or more processors also are configured to identify plural reference objects in the visual data. The reference objects are separated from each other outside of the vehicle by a previously measured distance. The one or more processors also are configured to compute a relative image distance between the reference objects in the visual data, and to translate the relative image distance between the reference objects in the visual data into a relative factual distance between the reference objects outside of the vehicle. The one or more processors are configured to identify another, non-reference object in the visual data and to calculate a distance from the vehicle to the non-reference object using the relative factual distance between the reference objects.

In one embodiment, a method includes obtaining visual data from an optical sensor mounted to a moving vehicle. The visual data is representative of a field of view of the optical sensor that is outside of the vehicle. The method also includes identifying plural reference objects in the visual data. The reference objects are separated from each other outside of the vehicle by a previously measured distance. The method also includes computing a relative image distance between the reference objects in the visual data, translating the relative image distance between the reference objects in the visual data into a relative factual distance between the reference objects outside of the vehicle, identifying another, non-reference object in the visual data, and calculating a distance from the vehicle to the non-reference object using the relative factual distance between the reference objects.

In one embodiment, a system includes a camera configured to generate two-dimensional (2D) image or video data of an area of a route ahead of a vehicle moving along the route. Wayside equipment is disposed alongside the route in the 2D image or video data. The system also includes one or more processors configured to determine a distance between reference markings in the route along a direction that is transverse to a direction of travel of the vehicle along the route. The one or more processors also are configured to determine a separation distance between the camera and the wayside equipment based on the distance between the reference markings in the route.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

The inventive subject matter described herein provides systems and methods that can automatically determine how far objects appearing in visual data obtained by an optical sensor are from the optical sensor. The systems and methods can examine features in the visual data that have known dimensions to determine a depth scale for objects appearing in the visual data. For example, the systems and methods can calculate how far two surfaces or objects are from each other in the visual data, such as in terms of the number of pixels that separate the surfaces or objects in the visual data. The systems and methods can determine how far these surfaces or objects actually are from each other (e.g., outside of the visual data), and determine a scale that translates the number of pixels separating objects in the visual data to the separation distance between the objects outside of the visual data. This scale can be used to determine how far other objects are from the optical sensor, such as by determining depth in the 2D visual data. This depth information can be used to determine how far the objects are from the optical sensor, geographic locations of the objects, relative locations of the objects from the optical sensor or a vehicle carrying the optical sensor, etc. In one embodiment, the depth information can be used in conjunction with the location of the vehicle and/or the speed at which the vehicle is moving to determine the geographic location of an object. This geographic location can be used to create, update, and/or verify information included in a database (or other memory structure) that indicates locations of wayside equipment for a vehicle transportation system.

Figure 1:
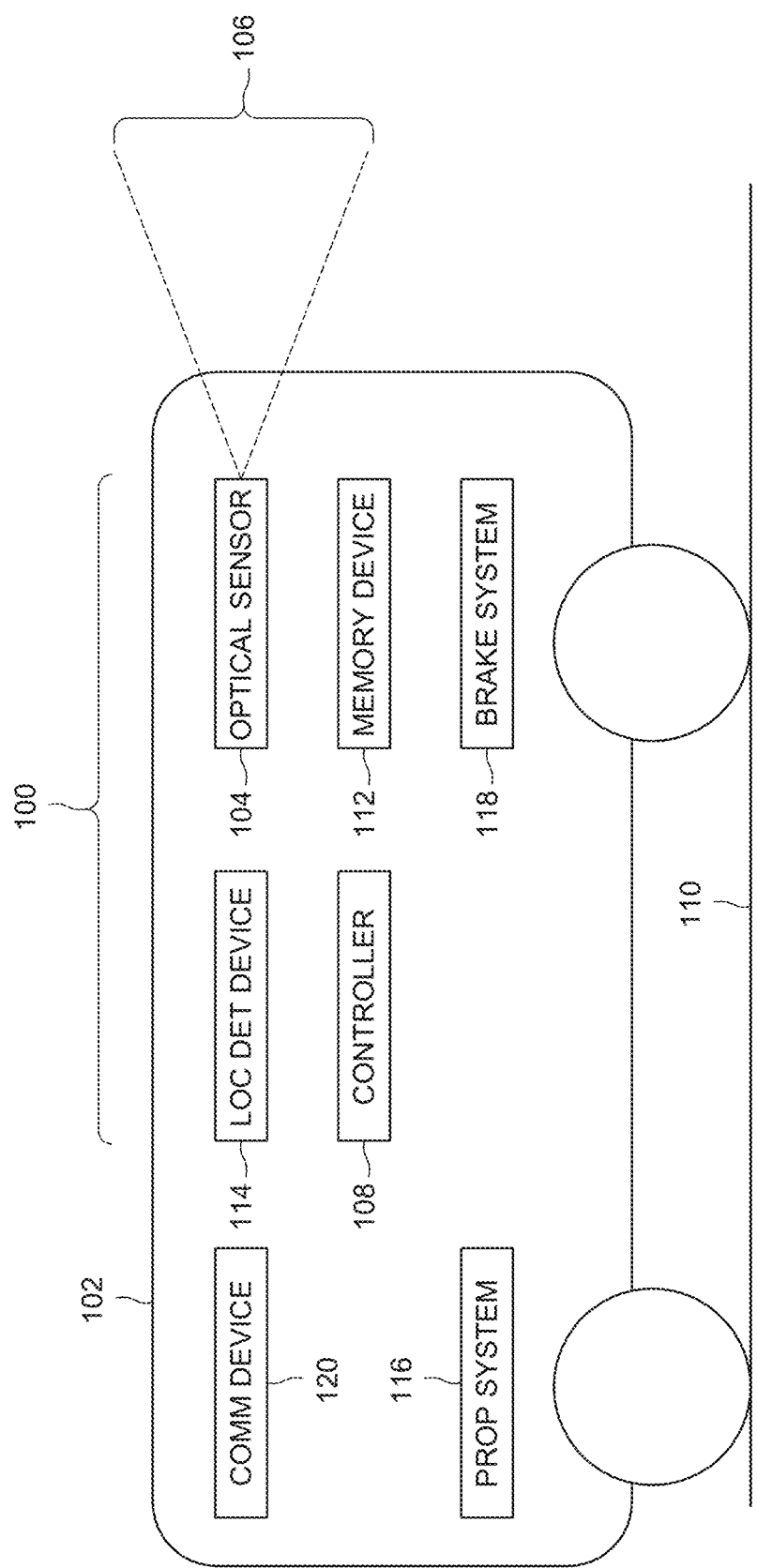
FIG. 1 illustrates one embodiment of a visual object detection system.

FIG. 1 illustrates one embodiment of a visual object detection system 100. The detection system is shown as being onboard a vehicle 102 traveling along a route 110, but optionally may be off-board the vehicle or may be disposed elsewhere. One or more components of the detection system may be onboard the vehicle, while one or more other components of the detection system may be onboard another vehicle or off-board all other vehicles. The vehicle can represent a rail vehicle, an automobile, a truck, a bus, a mining vehicle, another type of off-highway vehicle (e.g., a vehicle that is not designed or is not legally permitted for travel on public routes), a marine vessel, an aircraft (e.g., a manned or unmanned aerial vehicle), or the like.

The detection system 100 includes an optical sensor 104 that senses light or other information (e.g., infrared radiation) to generate visual data representative of objects appearing within a field of view 106 of the optical sensor. In one embodiment, the optical sensor is a camera that generates 2D images and/or 2D videos representative of the objects appearing in the field of view. The optical sensor may be mounted inside the vehicle, such as within a cab in which an operator of the vehicle is located, with the field of view of the optical sensor capturing objects outside of the vehicle and within the field of view of the optical sensor through one or more windows or openings of the vehicle. Alternatively, the optical sensor may be disposed outside of the vehicle.

In one embodiment, the detection system uses only the optical sensor to both obtain visual data of objects outside of the vehicle and to determine depth within the visual data (e.g., the distance from the optical sensor to the objects appearing in the visual data). For example, the detection system may use only a single camera, and not multiple cameras (e.g., using a stereoscopic technique), to determine depth within the visual data. As another example, the detection system may use only the single optical sensor, and not another type of sensor, to determine depth. The detection system may not use radar, lidar, sonar, structured light, or the like, to determine depth from the optical sensor to an object. Instead, the detection system may only examine information contained within the 2D visual data to determine depth of objects within the visual data.

The detection system includes or is connected with a controller 108. The controller represents hardware circuitry that includes or is connected with one or more processors (e.g., microprocessors, field programmable gate arrays, integrated circuits, or the like) that perform the functions of the controller described herein. The controller receives the visual data from the optical sensor and examines the visual data to determine how far objects shown in the visual data are from the optical sensor (and/or the vehicle).

Figure 2:
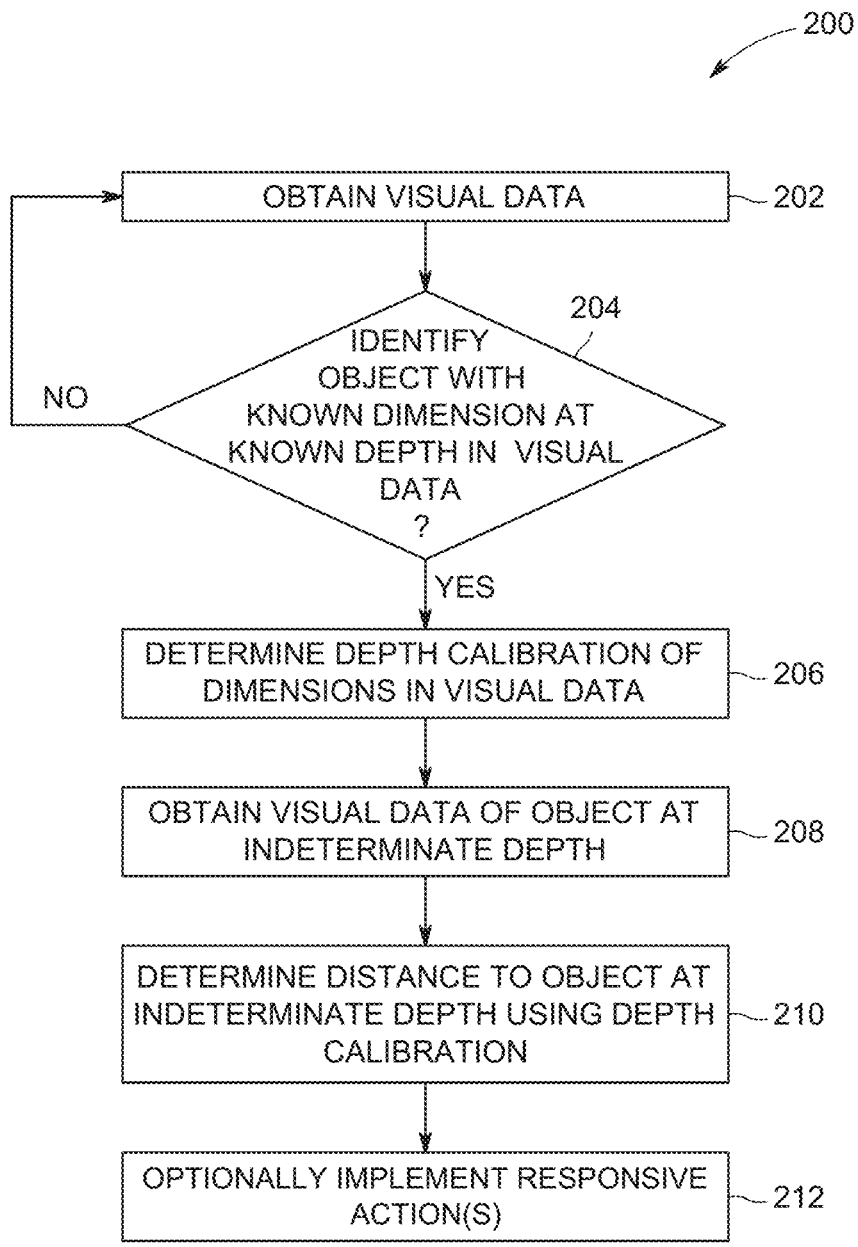
FIG. 2 illustrates a flowchart of one embodiment of a method for detecting objects in visual data and/or determining depth of objects in visual data.

With continued reference to the detection system 100 shown in FIG. 1, FIG. 2 illustrates a flowchart of one embodiment of a method 200 for detecting objects in visual data and/or determining depth of objects in visual data. The method can be performed by the controller. For example, the controller may operate under the instruction of one or more software applications that direct the operations described in connection with the flowchart. As another example, the flowchart may represent an algorithm that may be used to create one or more software applications that direct operation of the controller.

At 202, visual data is obtained. The visual data may be 2D visual data provided by or output by the optical sensor 104 (shown in FIG. 1). The visual data may be provided during movement of the vehicle 102 (shown in FIG. 1) or after completion of a segment or all of a trip of the vehicle.

Figure 3:
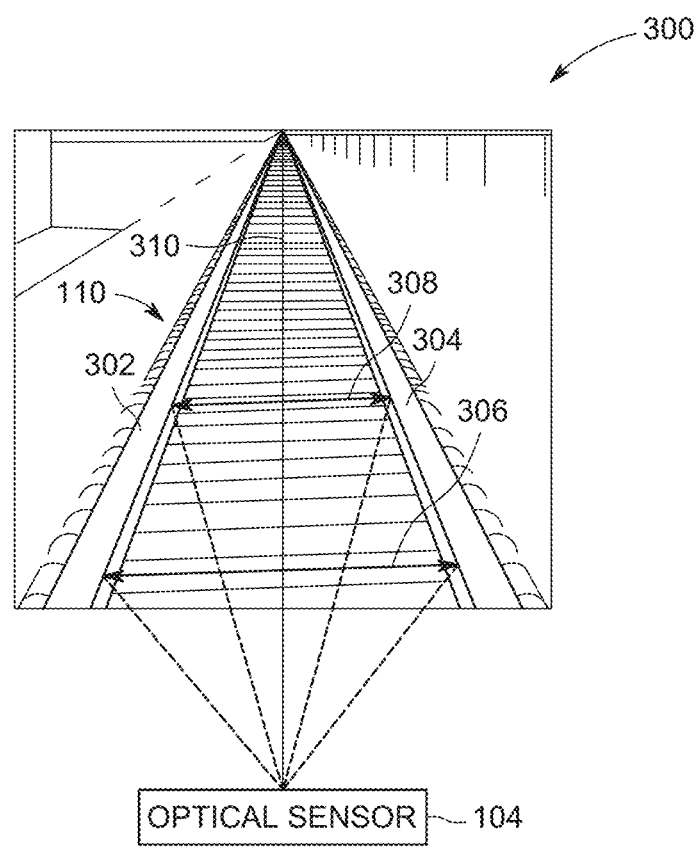
FIG. 3 illustrates one example of 2D visual data generated by an optical sensor 104 shown in FIG. 1.

With continued reference to both the detection system 100 shown in FIG. 1 and the flowchart of the method 200 shown in FIG. 2, FIG. 3 illustrates one example of 2D visual data 300 generated by the optical sensor 104 shown in FIG. 1. The visual data 300 shows a segment of the route 110 (shown in FIG. 1) on which the vehicle 102 (shown in FIG. 1) is traveling that is within the field of view 106 (shown in FIG. 1) of the optical sensor. The route includes reference portions 302, 304 that are a known distance 306, 308 away from each other outside of the visual data. For example, the route may be a track having rails that are a designated distance (e.g., gauge) away from each other to allow a rail vehicle to travel along the route. Optionally, the portions spaced apart by the known separation distance may be paint markings of a road, markings on a sign alongside the route, markings on a building, or the like. The portions, markings, etc., that are spaced apart from each other by a known distance may be referred to as reference markers. The distances 306, 308 between the markings may be measured along one or more directions that are transverse to a direction of travel of the vehicle, such as a direction that is perpendicular to a center line of the route being traveled upon by the vehicle.

At 204 in the flowchart of the method 200 shown in FIG. 2, a determination is made as to whether objects with known dimensions at a known depth are identified in the visual data. The controller may attempt to identify the portions of the route using optical detection techniques, such as detecting which pixels in the visual data having chromacities, colors, intensities, etc., that are different from some pixels but that are similar to other nearby pixels. The controller may attempt to determine if the portions of the route having the known separation distance at a known distance away from the optical sensor. For example, the controller may examine how far apart the rails of the track are from each other along the line representative of the separation distance 308 in FIG. 3. These lines at which the separation distance 306 and/or 308 may be known distances from the optical sensor, such as ten meters, twenty meters, etc. If the controller is unable to identify the portions of the route having the known separation distance at the known distance or depth from the optical sensor, then flow of the method 200 may return toward 202 to obtain additional visual data. But, if the controller is able to identify the portions of the route having the known separation distance at the known depth, then flow of the method 200 can proceed toward 206.

At 206, the depth of objects in the visual data is calibrated. The known dimension of the object in the visual data may be the separation distance 306, 308 between the portions 202, 204 of the route as determined by the controller. The actual distance between the portions of the route may be known to the controller, such as this information being stored in a memory device 112 (e.g., one or more servers, computer hard drives, databases, etc.). The controller can convert the separation distance measured in the visual data to the actual distance between the portions of the route.

Figure 4:
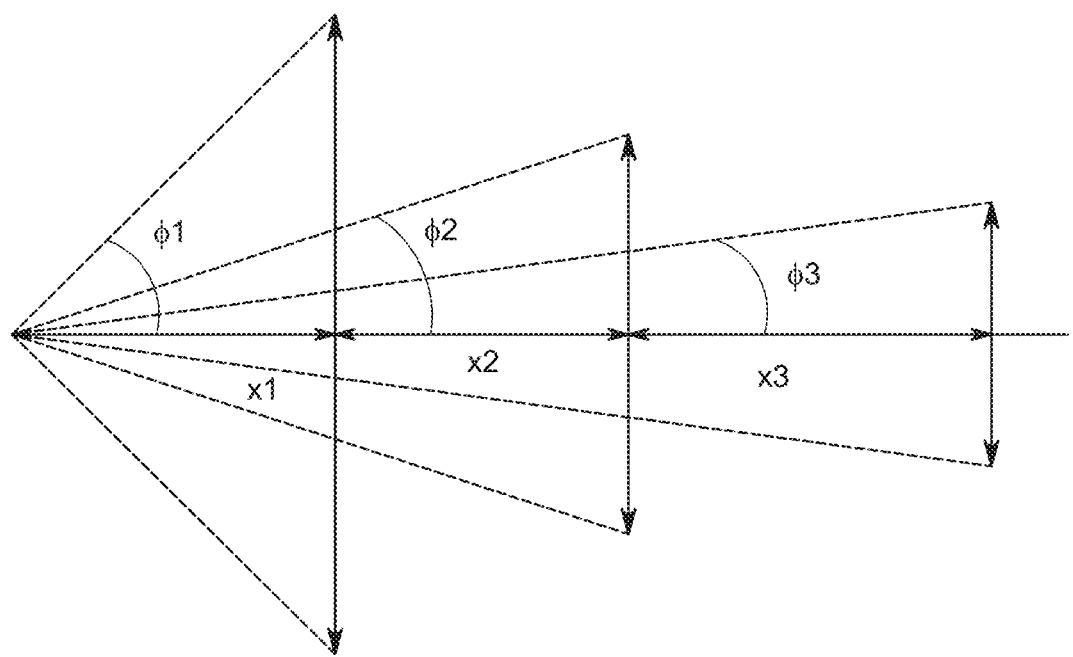
FIG. 4 illustrates one example of how a controller shown in FIG. 1 can convert the known dimension of an object in the visual data to an external scale.

FIG. 4 illustrates one example of how the controller can convert the known dimension of an object in the visual data to an external scale. A distance x1 in FIG. 4 represents the distance (outside of the visual data) from the optical sensor to the location where the separation distance 306 is measured in the visual data. A distance x2 in FIG. 4 represents the distance (outside of the visual data) from the optical sensor to the location where the separation distance 308 is measured in the visual data. An angle Φ1 in FIG. 4 represents the angle between a centerline 310 (shown in FIG. 3) of the route (or the center location between the portions of the route separated by the known distance) and one of the portions of the route at the location where the separation distance 306 is measured in the visual data. An angle Φ2 in FIG. 4 represents the angle between the centerline of the route and one of the portions of the route at the location where the separation distance 308 is measured in the visual data.

Based on this information, the controller may determine a calibration constant or scale to be used for determining depth within the visual data. For example, from this information, the controller can determine:

$$\tan \Phi_1 * x_1 = \tan \Phi_2 * (x_1 + x_2) \quad \text{(Eqn. 1)}$$

This relationship can be used to determine the depth distance (e.g., the distance from the optical sensor) to another location in the visual data. The other location may be represented by a distance x3 from the optical sensor along the centerline of the route, with the angle Φ3 representing the angle between the centerline of the route to one of the portions 302, 304 of the route at the distance x3 from the optical sensor, as shown in FIG. 4. The controller can determine the depth or distance from the optical sensor to the other location at x3 based on $\tan \Phi_1 * x_1$ being used as a calibration factor:

$$\tan \Phi_1 * x_1 = \tan \Phi_3 * (x_1 + x_2 + x_3) \quad \text{(Eqn. 2)}$$

At 208 in the flowchart of the method 200 shown in FIG. 2, visual data that represents locations of one or more objects at unknown or indeterminate depths or distances from the optical sensor is obtained. For example, the optical sensor may generate visual data showing the location of wayside equipment at an unknown distance from the optical sensor.

Figure 5:
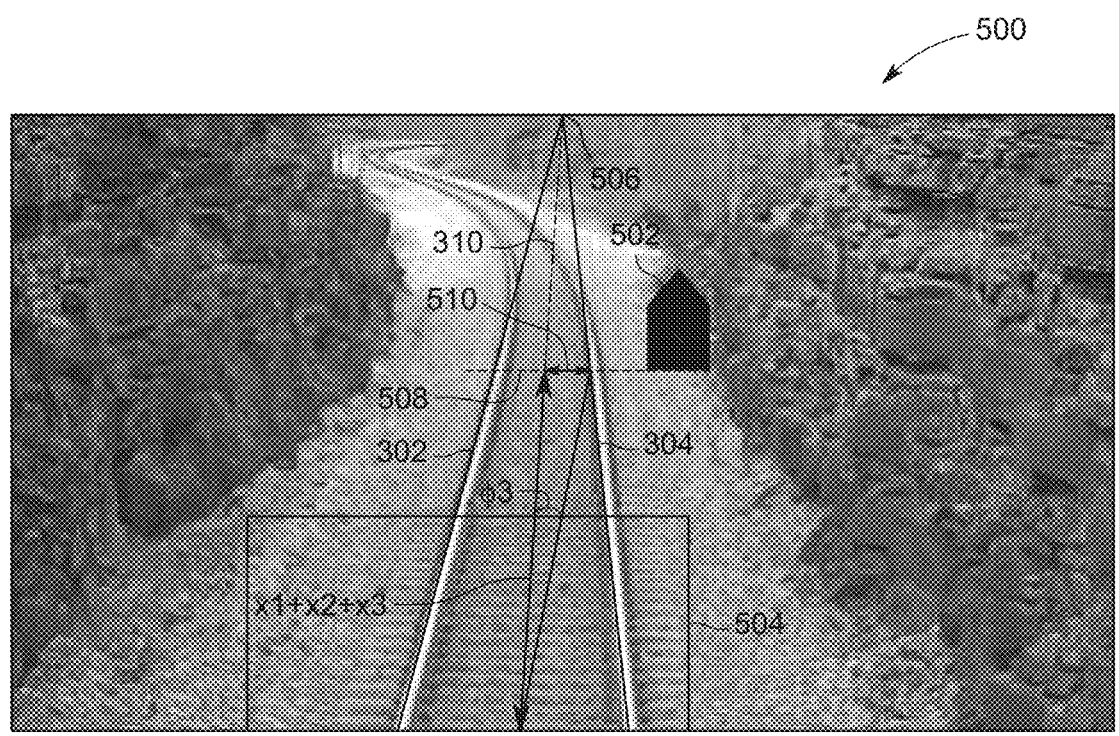
FIG. 5 illustrates additional visual data provided by the optical sensor shown in FIG. 1 according to one example.

FIG. 5 illustrates additional visual data 500 provided by the optical sensor shown in FIG. 1 according to one example. An object 502 is shown in the visual data 500, and may represent wayside equipment, such as a signal, sign, gate, or the like.

At 210 in the flowchart of the method 200 shown in FIG. 2, the distance to the object (from the optical sensor) is determined using the depth calibration described above. The controller can determine how far the object 502 is from the optical sensor by solving for Equation #2 shown above in one embodiment. The controller may identify the portions 302, 304 of the route as described above, and determine the centerline 310 between these portions 302, 304, as shown in FIG. 5. The segments of the portions 302, 304 of the route in a near field 504 of the optical sensor and the center line 310 may appear to converge toward a vanishing point 506, also as shown in FIG. 5.

The controller can determine the total distance (x1+x2+x3) from the optical sensor to the object 502 along the centerline 310 of the route. The controller can determine this distance by identifying the portion of the object 502 that is closest to the optical sensor in the visual data and identifying an intersection between a line 508 that is representative of this portion of the object 502 and the centerline 310. The total distance (x1+x2+x3) may then be measured to this intersection along the centerline 310.

The controller can determine the angle Φ3 by calculating the ratio between a distance 510 in the visual data (e.g., the number of pixels measured along the line 508 from the centerline 310 to either portion 302, 304 of the route) and a distance along the centerline in the visual data (e.g., the number of pixels) from the optical sensor to the line 508. The controller may then calculate the distance from the optical sensor to the object 502 by solving for (x1+x2+x3) in Equation #2:

$$(x_1 + x_2 + x_3) = \frac{\tan \phi_1 * x_1}{\tan \phi_3}$$

This distance (x1+x2+x3) can be the actual distance from the optical sensor to the object, such as the distance that separates the vehicle from the object.

At 212, the method 200 optionally includes implementing one or more actions responsive to determining the distance from the optical sensor (or vehicle) to the object. One action may be to record the location of the object in the memory of the vehicle. For example, the vehicle may be traveling to determine locations of wayside equipment for creation or updating of a database of wayside equipment locations. Responsive to determining how far the object is from the vehicle, the controller may determine the location of the vehicle from a location determining device 114 ("Loc Det Device" in FIG. 1), such as a global positioning system (GPS) receiver. The controller may then determine where the object is located (e.g., an absolute position or geographic location of the object instead of merely the distance of the object from the vehicle) based on the distance from the vehicle to the object. This location may be recorded in the memory device of the vehicle and/or communicated to an off-board location via a communication device 120. The communication device includes transceiving circuitry that includes and/or is connected with antennas for wirelessly communicating information via the off-board location(s).

Another action may be to change movement of the vehicle. For example, responsive to determining that the vehicle is closer to the object than a designated safety distance (e.g., three meters, ten meters, one hundred meters, etc.), the controller may automatically generate and communicate a control signal to a propulsion system 116 ("Prop System" in FIG. 1) and/or a brake system 118 (shown in FIG. 1) of the vehicle to slow or stop movement of the vehicle. The propulsion system 116 can include one or more engines, alternators/generators, motors, and the like, that generate tractive effort to propel the vehicle. The brake system 118 can include one or more air brakes, friction brakes, etc., that generate braking effort to slow or stop movement of the vehicle. Responsive to receiving the control signal, the propulsion system and/or brake system may automatically slow or stop movement of the vehicle.

In one embodiment, a system includes one or more processors configured to receive visual data representative of an object located outside of a vehicle. The one or more processors are configured to determine a distance from the vehicle to the object based on a known distance between reference markers in the visual data.

The one or more processors can be configured to automatically create or update a database of a location of the object based on the distance from the vehicle to the object that is determined by the one or more processors.

The one or more processors can be configured to automatically change movement of the vehicle responsive to determining the distance from the vehicle to the object that is determined by the one or more processors.

The visual data can include one or more of two-dimensional (2D) images or videos, and the one or more processors can be configured to determine the distance from the vehicle to the object along a third dimension. This distance may be determined without the use or aid of any additional sensors.

The one or more processors can be configured to determine the distance from the vehicle to the object along a route being traveled by the vehicle and outside of the visual data. For example, the distance may be determined outside of the visual data as a distance along the route (e.g., in the real world and not in the imaged representation of the route).

The one or more processors can be configured to determine the distance from the vehicle to the object without information provided from a sensor other than a single optical sensor. The single optical sensor may be a camera.

The known distance between the reference markers can be a separation distance between rails of a track being traveled by the vehicle. For example, the known distance may be a gauge of the track.

The known distance between the reference markers can be a separation distance between marking in a road being traveled by the vehicle. For example, the solid lines on outer edges of a public road and/or the broken or solid lines dividing lanes of the road may be used as the reference markers, with the distance between these lines being known or previously measured.

The one or more processors can be configured to determine the distance from the vehicle to the object based on the known distance between the reference markers in the visual data at a known location outside of the vehicle and based on a separation distance between the reference markers at a location of the object in the visual data.

In one embodiment, a method includes receiving visual data representative of an object located outside of a vehicle, determining a known distance between reference markers in the visual data, and determining a distance from the vehicle to the object based on the known distance.

The method also can include automatically creating or updating a database of a location of the object based on the distance from the vehicle to the object that is determined by the one or more processors.

The method also can include automatically changing movement of the vehicle responsive to determining the distance from the vehicle to the object that is determined by the one or more processors.

The visual data can include one or more of two-dimensional (2D) images or videos, and the distance from the vehicle to the object that is determined can be determined along a third dimension.

The distance from the vehicle to the object can be determined along a route being traveled by the vehicle and outside of the visual data.

The distance from the vehicle to the object can be determined without information provided from a sensor other than a single optical sensor. The single optical sensor can be a camera.

The known distance between the reference markers can be a separation distance between rails of a track being traveled by the vehicle.

Optionally, the known distance between the reference markers can be a separation distance between marking in a road being traveled by the vehicle.

In one embodiment, a system includes a camera configured to generate two-dimensional (2D) image or video data of an area of a route ahead of a vehicle moving along the route, wherein wayside equipment is disposed alongside the route in the 2D image or video data. The system also includes one or more processors configured to determine a distance between reference markings in the route along a direction that is transverse to a direction of travel of the vehicle along the route. The one or more processors also are configured to determine a separation distance between the camera and the wayside equipment based on the distance between the reference markings in the route.

The distance between the reference markings in the route can be a gauge of a track having multiple rails.

The one or more processors can be configured to determine a geographic location of the wayside equipment based on the separation distance and a current geographic location of the vehicle.

The one or more processors can be configured to automatically change movement of the vehicle responsive to determining the separation distance.

The one or more processors can be configured to determine the separation distance along a third dimension.

In one embodiment, a system includes an optical sensor that is configured to be mounted to a moving vehicle. The optical sensor is configured to generate visual data representative of a field of view of the optical sensor that is outside of the vehicle. One or more processors of the system are configured to receive the visual data representative of the one or more objects located outside of the vehicle. The one or more processors also are configured to identify plural reference objects in the visual data. The reference objects are separated from each other outside of the vehicle by a previously measured distance. The one or more processors also are configured to compute a relative image distance between the reference objects in the visual data, and to translate the relative image distance between the reference objects in the visual data into a relative factual distance between the reference objects outside of the vehicle. The one or more processors are configured to identify another, non-reference object in the visual data and to calculate a distance from the vehicle to the non-reference object using the relative factual distance between the reference objects.

The reference objects may be objects having previously determined or otherwise known locations outside of the vehicle, which can allow for the processor(s) to know or determine how far the reference objects are from each other outside of the vehicle (e.g., in the real world or outside of the visual data). The non-reference object can be an item that does not have a known or previously determined location, or that has a known or previously determined location that is being checked, verified, or otherwise validated using the visual data and the known distance between the reference objects. The reference objects and/or non-reference objects can be identified by the processor(s) using image recognition technology. The relative image distance between the reference objects that is computed by the processor(s) is the distance between the reference objects in the frame of reference of the visual data. The relative factual distance between the reference objects that is computed by the processor(s) is the actual distance between the reference objects outside of the visual data and outside of the vehicle. For example, two reference objects may appear to be one centimeter apart in the visual data (i.e., the relative image distance), but may actually be two meters apart from each other in the real world (i.e., the relative factual distance).

Optionally, the non-reference object has a previously measured geographic location that is stored in a database. The one or more processors can be configured to determine a geographic location of the vehicle, to calculate a current geographic location of the non-reference object based on the geographic location of the vehicle and the distance from the vehicle to the non-reference object, and to update the previously measured geographic location of the non-reference object in the database with the current geographic location of the non-reference object.

Optionally, the one or more processors are configured to automatically change movement of the vehicle responsive to calculating the distance from the vehicle to the non-reference object that is calculated by the one or more processors.

For example, responsive to determining that the distance from the moving vehicle to the non-reference object is at or within a designated threshold of a stopping distance of the vehicle (e.g., within 125% of the distance needed for the vehicle to stop, which can be calculated based on the speed and weight of the vehicle, among other factors), the processor(s) can automatically engage a brake of the vehicle to slow or stop movement of the vehicle. This can prevent the vehicle from striking the object. In self-driving vehicles or vehicles that are otherwise at least partially automatically controlled, this can help prevent the vehicle from striking another vehicle, a person, or other object.

Optionally, the visual data includes one or more of two-dimensional (2D) images or videos representative of horizontal and vertical dimensions, and the one or more processors are configured to calculate the distance from the vehicle to the non-reference object along a third depth dimension. The horizontal dimension can be a lateral direction in the frame of reference of the visual data (e.g., left to right or right to left). The vertical dimension can be orthogonal (e.g., perpendicular) to the lateral direction in the frame of reference of the visual data. The depth dimension can be orthogonal (e.g., perpendicular) to both of the horizontal and vertical dimensions in the frame of reference of the 2D visual data (e.g., in and out of the plane of the visual data).

Optionally, the one or more processors are configured to calculate the distance from the vehicle to the non-reference object along a route being traveled by the vehicle and that is not visible in or represented by the visual data. For example, the processor(s) can calculate the distance to the non-reference object on or along the surface being traveled upon by the vehicle and that is at least partially not visible in or represented by the visual data.

Optionally, the one or more processors are configured to calculate the distance from the vehicle to the non-reference object without information provided from a sensor other than a single camera as the optical sensor.

Optionally, the reference objects are rails of a track on which the vehicle is moving and the previously measured distance is a gauge of the track (e.g., the lateral distance between the rails).

Optionally, the reference objects are markings on a road on which the vehicle is moving and the previously measured distance is a separation distance between the markings on the road. For example, the reference objects can be paint applied to the road.

In one embodiment, a method includes obtaining visual data from an optical sensor mounted to a moving vehicle. The visual data is representative of a field of view of the optical sensor that is outside of the vehicle. The method also includes identifying plural reference objects in the visual data. The reference objects are separated from each other outside of the vehicle by a previously measured distance. The method also includes computing a relative image distance between the reference objects in the visual data, translating the relative image distance between the reference objects in the visual data into a relative factual distance between the reference objects outside of the vehicle, identifying another, non-reference object in the visual data, and calculating a distance from the vehicle to the non-reference object using the relative factual distance between the reference objects.

Optionally, the non-reference object has a previously measured geographic location that is stored in a database. The method also can include determining a geographic location of the vehicle, calculating a current geographic location of the non-reference object based on the geographic location of the vehicle and the distance from the vehicle to the non-reference object, and updating the previously measured geographic location of the non-reference object in the database with the current geographic location of the non-reference object.

Optionally, the method also includes automatically changing movement of the vehicle responsive to determining the distance from the vehicle to the non-reference object that is calculated by the one or more processors.

Optionally, the visual data includes one or more of two-dimensional (2D) images or videos representative of horizontal and vertical dimensions, and the distance from the vehicle to the non-reference object is calculated along a third depth dimension.

Optionally, the distance from the vehicle to the non-reference object is calculated along a route being traveled by the vehicle and that is not visible in or represented by the visual data.

Optionally, the distance from the vehicle to the non-reference object is calculated without information provided from a sensor other than a single camera as the optical sensor.

Optionally, the reference objects are rails of a track on which the vehicle is moving and the previously measured distance is a gauge of the track.

Optionally, the reference objects are markings on a road on which the vehicle is moving and the previously measured distance is a separation distance between the markings on the road.

In one embodiment, a system includes a camera configured to generate two-dimensional (2D) image or video data of an area of a route ahead of a vehicle moving along the route. Wayside equipment is disposed alongside the route in the 2D image or video data. The system also includes one or more processors configured to determine a distance between reference markings in the route along a direction that is transverse to a direction of travel of the vehicle along the route. The one or more processors also are configured to determine a separation distance between the camera and the wayside equipment based on the distance between the reference markings in the route.

Optionally, the distance between the reference markings in the route is a gauge of a track having multiple rails.

Optionally, the one or more processors are configured to determine a geographic location of the wayside equipment based on the separation distance and a current geographic location of the vehicle.

Optionally, the one or more processors are configured to automatically change movement of the vehicle responsive to determining the separation distance.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
an optical sensor configured to be mounted to a moving vehicle, the optical sensor configured to generate visual data representative of a field of view of the optical sensor that is outside of the vehicle; and
one or more processors configured to receive the visual data representative of one or more objects located outside of the vehicle, the one or more processors configured to identify plural reference objects in the visual data, wherein the reference objects are separated from each other outside of the vehicle by a previously measured distance, said previously measured distance being transverse to a direction of travel of the vehicle,
wherein the one or more processors also are configured to compute a relative image distance between the reference objects in the visual data, and to translate the relative image distance between the reference objects in the visual data into a relative factual distance between the reference objects outside of the vehicle,
wherein the one or more processors are configured to identify another, non-reference object in the visual data and to calculate a distance from the vehicle to the non-reference object using the relative factual distance between the reference objects.

2. The system of claim 1, wherein the non-reference object has a previously measured geographic location that is stored in a database, and wherein the one or more processors are configured to determine a geographic location of the vehicle, to calculate a current geographic location of the non-reference object based on the geographic location of the vehicle and the distance from the vehicle to the non-reference object, and to update the previously measured geographic location of the non-reference object in the database with the current geographic location of the non-reference object.

3. The system of claim 1, wherein the one or more processors are configured to automatically change movement of the vehicle responsive to calculating the distance from the vehicle to the non-reference object that is calculated by the one or more processors.

4. The system of claim 1, wherein the visual data includes one or more of two-dimensional (2D) images or videos representative of horizontal and vertical dimensions, and the one or more processors are configured to calculate the distance from the vehicle to the non-reference object along a third depth dimension.

5. The system of claim 1, wherein the one or more processors are configured to calculate the distance from the vehicle to the non-reference object along a route being traveled by the vehicle and that is not visible in or represented by the visual data.

6. The system of claim 1, wherein the one or more processors are configured to calculate the distance from the vehicle to the non-reference object without information provided from a sensor other than a single camera as the optical sensor.

7. The system of claim 1, wherein the reference objects are rails of a track on which the vehicle is moving and the previously measured distance is a gauge of the track.

8. The system of claim 1, wherein the reference objects are markings on a road on which the vehicle is moving and the previously measured distance is a separation distance between the markings on the road.

9. A method comprising:
obtaining visual data from an optical sensor mounted to a moving vehicle, the visual data representative of a field of view of the optical sensor that is outside of the vehicle;
identifying plural reference objects in the visual data, the reference objects separated from each other outside of the vehicle by a previously measured distance, said previously measured distance being transverse to a direction of travel of the vehicle;
computing a relative image distance between the reference objects in the visual data;
translating the relative image distance between the reference objects in the visual data into a relative factual distance between the reference objects outside of the vehicle;
identifying another, non-reference object in the visual data; and
calculating a distance from the vehicle to the non-reference object using the relative factual distance between the reference objects.

10. The method of claim 9, wherein the non-reference object has a previously measured geographic location that is stored in a database, and further comprising:
determining a geographic location of the vehicle;
calculating a current geographic location of the non-reference object based on the geographic location of the vehicle and the distance from the vehicle to the non-reference object; and
updating the previously measured geographic location of the non-reference object in the database with the current geographic location of the non-reference object.

11. The method of claim 9, further comprising:
automatically changing movement of the vehicle responsive to determining the distance from the vehicle to the non-reference object that is calculated by the one or more processors.

12. The method of claim 9, wherein the visual data includes one or more of two-dimensional (2D) images or videos representative of horizontal and vertical dimensions, and the distance from the vehicle to the non-reference object is calculated along a third depth dimension.

13. The method of claim 9, wherein the distance from the vehicle to the non-reference object is calculated along a route being traveled by the vehicle and that is not visible in or represented by the visual data.

14. The method of claim 9, wherein the distance from the vehicle to the non-reference object is calculated without information provided from a sensor other than a single camera as the optical sensor.

15. The method of claim 9, wherein the reference objects are rails of a track on which the vehicle is moving and the previously measured distance is a gauge of the track.

16. The method of claim 9, wherein the reference objects are markings on a road on which the vehicle is moving and the previously measured distance is a separation distance between the markings on the road.

17. A system comprising:
a camera configured to generate two-dimensional (2D) image or video data of an area of a route ahead of a vehicle moving along the route, wherein wayside equipment is disposed alongside the route in the 2D image or video data; and
one or more processors configured to determine a distance between reference markings in the route along a direction that is transverse to a direction of travel of the vehicle along the route, the one or more processors also configured to determine a separation distance between the camera and the wayside equipment based on the distance between the reference markings in the route.

18. The system of claim 17, wherein the distance between the reference markings in the route is a gauge of a track having multiple rails.

19. The system of claim 17, wherein the one or more processors are configured to determine a geographic location of the wayside equipment based on the separation distance and a current geographic location of the vehicle.

20. The system of claim 17, wherein the one or more processors are configured to automatically change movement of the vehicle responsive to determining the separation distance.

* * * * *